Oct. 27, 1970 T. H. ENGLE 3,536,360
BLENDING SCHEME FOR FLUID-OPERATED AND DYNAMIC BRAKES
Filed Jan. 27, 1969 2 Sheets-Sheet 1

INVENTOR
THOMAS H. ENGLE

BY Dodge & Ostmann
ATTORNEYS

Oct. 27, 1970 T. H. ENGLE 3,536,360
BLENDING SCHEME FOR FLUID-OPERATED AND DYNAMIC BRAKES
Filed Jan. 27, 1969 2 Sheets-Sheet 2

INVENTOR
THOMAS H. ENGLE

BY Dodge & Ostmann

ATTORNEYS

United States Patent Office 3,536,360
Patented Oct. 27, 1970

3,536,360
BLENDING SCHEME FOR FLUID-OPERATED AND DYNAMIC BRAKES
Thomas H. Engle, Cape Vincent, N.Y., assignor to General Signal Corporation, a corporation of New York
Filed Jan. 27, 1969, Ser. No. 794,122
Int. Cl. B60t *13/74, 13/66*
U.S. Cl. 303—3            8 Claims

ABSTRACT OF THE DISCLOSURE

Scheme for blending the braking efforts of the conventional air-operated and dynamic brakes used on railway passenger cars. The scheme utilizes the dynamic brake as the primary brake and graduates the braking effort of the airbrake so as to match any difference between the braking command and the effort of the dynamic brake.

BACKGROUND AND SUMMARY OF THE INVENTION

At the present time, the braking efforts of the pneumatic and dynamic brakes employed on railway passenger cars usually are blended by a simple one-step process. In essence, this scheme either disables the airbrake or allows it to respond fully in its normal fashion depending upon whether dynamic braking current is above or below a predetermined level. Although this approach has been accepted, it is inherently inefficient because it does not utilize fully the capability of the dynamic brake. Moreover, it is not a satisfactory solution to the blending problem presented by the higher speed trains now being proposed. The difficulty encountered with high speed cars stems from the nature of the relationship between dynamic brake effectiveness and speed. In the normal case, the output of the dynamic brake, at a given control setting, rises to a maximum at an intermediate speed and then decreases as the train accelerates to higher speeds. Since, with this relationship, a specified change in train speed can produce either an increase or a decrease in dynamic braking current depending upon the absolute speed, it is evident that proper braking action will not be afforded by the one-step blending process.

The object of this invention is to provide an improved brake-blending system which is adapted to employ conventional pneumatic and dynamic braking equipment, which utilizes the full capability of the dynamic brake, and which affords the required braking action throughout any range of operating speeds. According to the invention, the dynamic brake is the primary brake, and the pneumatic brake serves as a supplemental brake which is utilized only to the extent necessary to satisfy a deficiency between the braking command and the dynamic brake output. This effect is afforded by a blending transducer which is interposed between the control and brake-applying sections of the pneumatic brake, and which responds to three inputs representing, respectively, the braking command, and the outputs of the two brakes. The transducer algebraically combines these inputs and controls the supply of air to and the exhaust of air from the brake-applying means as required to maintain a balance between the command input and the sum of the other two inputs. This arrangement compensates completely for the effect of speed on the dynamic brake and insures full utilization of dynamic braking capability. In addition, the system is inherently fail-safe with respect to malfunction of the dynamic brake since this condition will manifest itself merely as a deficiency in dynamic brake output.

BRIEF DESCRIPTION OF THE DRAWINGS

Several illustrative embodiments of the invention are described herein with reference to the accompanying drawings in which.

DESCRIPTION OF THE EMBODIMENT OF FIGS. 1 AND 2

Figure 1:
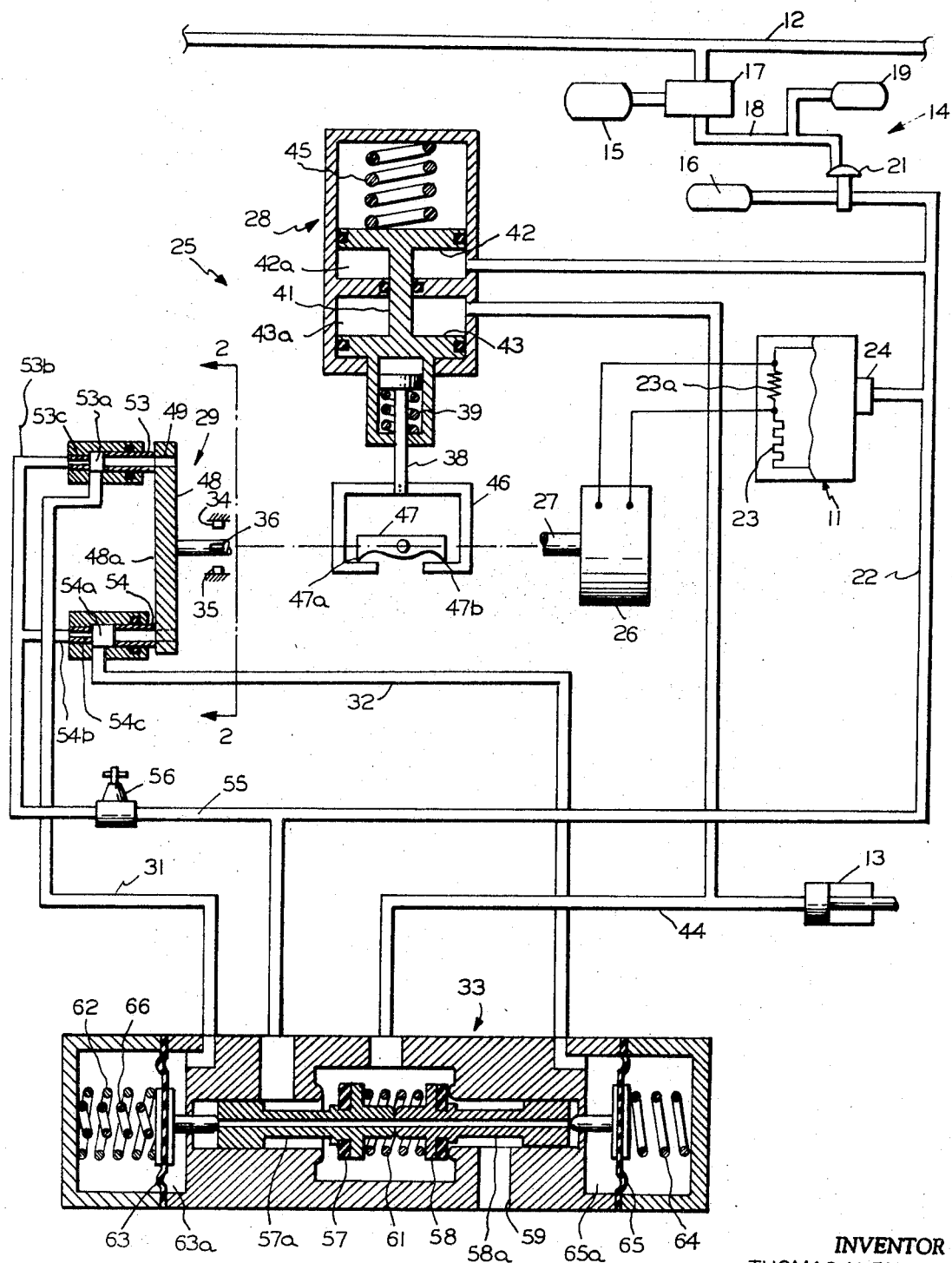
FIG. 1 is a schematic diagram of the improved blending scheme employed on a car equipped with an airbrake of the automatic type.
Figure 2:
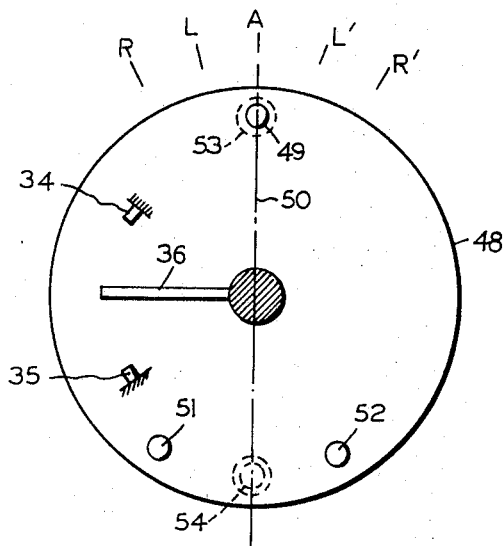
FIG. 2 is a sectional view taken on line 2—2 of FIG. 1.

The embodiment illustrated in FIGS. 1 and 2 employs a dynamic brake 11, and an automatic airbrake consisting of a trainlined brake pipe 12, fluid-operated brake-applying means in the form of a pneumatic brake cylinder 13, and a control section 14. The control section is conventional and includes main and supply reservoirs 15 and 16, respectively, a triple valve 17 having an output circuit 18 containing a dummy volume 19, a relay valve 21 which responds to the pressure established in circuit 18, and an outlet pipe 22. In effect, control section 14 establishes in circuit 18 a pressure corresponding to the reduction in pressure in brake pipe 12 and maintains in pipe 22 a pressure proportional to the pressure in circuit 18. Thus, the pressure in pipe 22 is an amplified version of the braking command.

Dynamic brake 11 also may be conventional and includes a resistor grid 23, and a controller 24 which responds to the pressure in outlet pipe 22 and provides the field of the traction motor with a current which varies directly with that pressure. It will be understood that the complete dynamic brake also includes a propulsion controller (not shown) in the lead unit of the train which permits the operator to switch the propulsion control circuits of the traction motors between the motoring and dynamic braking configurations.

The outlet pipe 22 of airbrake control section 14 is connected with brake cylinder 13 through a blending transducer 25 which serves to maintain a balance between the braking command and the sum of the efforts of the dynamic and pneumatic brakes. The transducer consists of four main components; namely, an electrical torque motor 26 which responds to the current in resistor grid 23 and exerts a proportional torque on a comparator shaft 27, a differential pneumatic torque motor 28 which applies to shaft 27 a resisting torque which is proportional to the difference between the pressure in outlet pipe 22 and the pressure applied to brake cylinder 13, a pilot valve assembly 29 which is driven by shaft 27 and serves to control the pressures in a pair of pilot passages 31 and 32, and a main valve assembly 33 which responds to the piloting pressures and serves to control the supply of air from outlet pipe 22 to brake cylinder 13 and the exhaust of air from the brake cylinder to atmosphere. The electrical torque motor 26 is of known design and comprises a permanent magnet rotor which rotates within a wound stator. The torque output of motor 26 is directly proportional to the magnitude of the current and the sine of the magnetic angle between adjacent unlike poles of the rotor and stator. The angular motion of comparator shaft 27 is limited by a pair of stops 34 and 35 which coact with an arm 36 fixed to the shaft; therefore, the sine of the magnetic angle is substantially constant, and the torque output of the motor will vary substantially linearly with current. In a typical case wherein the transducer employs a two-pole motor, the magnetic angle is held between 72° and 90°, regardless of the direction of rotation. Thus, the sine always is between 0.95 and 1.00, and the deviation from true linearity is only 5%. It should be noted that while torque motor 26 responds to the current flow through resistor grid 23, it is connected across a shunt resistor 23a in series with the grid and thus actually handles only a small portion of the grid current. Preferably this shunt resistor 23a is a portion of the grid not subject to burn-out.

Pneumatic torque motor 28 comprises a drive rod 38 which is urged upward by a calibration spring 39 whose lower end is seated on a tubular extension of the piston assembly 41 of a pair of opposed, equal area air motors 42 and 43. The working spaces 42a and 43a of the motors are connected, respectively, with outlet pipe 22 and brake cylinder pipe 44, so the assembly 41 is urged upward with a force proportional to the difference between the pressures in these pipes. This movement of assembly 41 is opposed by a meter spring 45 which is considerably stronger than calibration spring 39 and is so chosen that, for any given pressure differential within the design range of transducer 25, assembly 41 will assume a definite position in its cylinder. The upward force which calibration spring 39 exerts on rod 38 varies directly with the deflection of meter spring 45, and consequently is proportional to the difference between braking command and airbrake effort. Spring 39 is so chosen that it exerts little or no force on rod 38 when the differential is a minimum and assembly 41 is in its lowest position, while, on the other hand, it applies a definite maximum force when the differential is a maximum and assembly 41 is in its uppermost position. At its lower end, drive rod 38 carries a yoke 46 which acts upon shaft 27 through one of a pair of knife edges 47a and 47b located at opposite ends of a transverse arm 47 fixed to the shaft. The knife edges are spaced equally from the axis of shaft 27 so that, regardless of the direction of rotation, motor 28 will apply the same resisting torque.

Pilot valve assembly 29 comprises a flat, hardened steel disc 48 which is fixed to rotate with comparator shaft 27 and contains three through ports 49, 51 and 52; the port 49 being centered on disc axis 50 (see FIG. 2), and the ports 51 and 52 being spaced from this axis equal distances in opposite directions. Cooperating with the disc is a pair of diametrically opposed, floating tubular valve seats 53 and 54 which bear against the ground and lapped face 48a and are arranged to register, respectively, with the port 49 or one or the other of the ports 51 and 52. The seats are held against disc 48 by the pressures in the chambers 53a and 54a at their left ends, and, since the cross sectional area of each seat which is subject to this biasing pressure is equal to the contact area of the seat and disc, the seats are essentially pressure balanced. This balancing feature minimizes the torque which motor 26 must develop to operate pilot valve assembly 29. Disc 48 and seats 53 and 54 define a pair of pilot valves which are so arranged that:

(a) In the center or application position of the disc, labeled A in FIG. 2, valve 48, 53 is open and valve 48, 54 is closed;

(b) In either of the release positions, labeled R and R', the valve 48, 54 is open and the valve 48, 53 is closed; and (c) In either of the intermediate lap position, labeled L and L', both valves are closed.

In the illustrated embodiment, it is assumed that disc 48 can move 18° to either side of the application position, and that each of the ports 49, 51 and 52 and the inside bore of each of the seats 53 and 54 subtend an angle of 6°. With this arrangement, application position A encompasses a 12° range of movement of disc 48, and each of the other positions, R, R', L and L' encompasses a 6° range of movement. The chambers 53a and 54a of the two pilot valves are connected with outlet pipe 22 through a pilot supply pipe 55, pressure reducer 56, branch connections 53b and 54b, and chokes 53c and 54c.

When the operator is calling for braking action (i.e., when pipe 22 is pressurized), pilot valve assembly 29 will pressurize pilot passage 32 and vent pilot passage 31 when disc 48 is in application position, will pressurize passage 31 and vent passage 32 in either of the release positions, and will pressurize both pilot passages in either of the lap positions.

Main valve assembly 33 includes poppet type supply and exhaust valves 57 and 58, respectively, arranged to control flow from outlet pipe 22 to brake cylinder pipe 44 and from the last mentioned pipe to an atmospheric vent port 59. The main valves are carried by balancing spools 57a and 58a which reciprocate in axially aligned bores and are arranged so that as each moves in the valve-opening direction it engages the other and causes it to move in the valve-closing direction. The opposite ends of each balancing spool have equal cross sectional areas and are interconnected by a passage extending through the spool. This renders the valves insensitive to changes in transducer outlet pressure. The supply and exhaust valves 57 and 58 are biased closed by a common compression spring 61 which is interposed between them, and each is shifted in the opening direction by a piloted motor means comprising either compression spring 62 and diaphragm motor 63 or compression spring 64 and diaphragm motor 65. The two piloted motor means are identical except that the one associated with supply valve 57 includes an additional spring 66. The arrangement of the parts is such that:

(a) Springs 62 and 66 open supply valve 57 and hold exhaust valve 58 closed when motor 63 is vented and motor 65 is pressurized, (b) Spring 64 opens exhaust valve 58 and holds supply valve 57 closed when motor 65 is vented and motor 63 is pressurized, (c) Spring 61 closes both valves when both diaphragm motors are pressurized, and (d) Springs 62 and 66 open supply valve 57 and hold exhaust valve 58 closed when both motors are vented.

The working spaces 63a and 65a of the motors 63 and 65 are connected, respectively, with pilot passages 31 and 32, and therefore it will be realized that the first three conditions of main valve 33 just mentioned correspond, respectively, to the application, release and lap positions of pilot valve assembly 29. The fourth condition occurs whenever outlet pipe 22 is vented, regardless of the position of pilot valve assembly 29.

Blending transducer 25 embodies some of the teachings of co-pending application Ser. No. 761,656, filed Sept. 23, 1968, so that disclosure is hereby incorporated in the present specification.

When the FIG. 1 system is in service and the pressure in brake pipe 12 is a maximum, both the triple valve output circuit 18 and the outlet pipe 22 will be vented. Therefore, the parts of blending transducer 25 will assume their illustrated positions, and the air brake will be released. With the propulsion controller set in a running position, the circuits of dynamic brake 11 will be in the motoring, rather than the braking, configuration.

In order to apply the brakes, the operator shifts the propulsion controller to coast position, to thereby switch the circuits of dynamic brake 11 to the braking configuration and establish a minimum dynamic braking effort, and also reduces the pressure in brake pipe 12. Triple valve 17 now raises the pressure in output circuit 18 an amount corresponding to the brake pipe reduction, and relay valve 21 opens a supply path from reservoir 16 to outlet pipe 22 and commences to establish and maintain a proportional pressure in that pipe. Since, at this time, pilot valve assembly 29 is in application position, main supply valve 57 remains open, and, at least initially, the pressure in brake cylinder 13 will rise at the same rate as the pressure in pipe 22. Thus, air motors 42 and 43 will be subjected to equal pressures, and pneumatic torque motor 28 will continue to exert a minimum torque on comparator shaft 27. As the pressure in outlet pipe 22 rises, controller 24 begins to increase the current supplied to the field of the traction motor. Therefore, that motor will now act as a generator and supply current to resistor grid 23. The current in the grid 23 will increase as the dynamic braking effort increases, so electric torque motor 26 will quickly overpower pneumatic torque motor 28 and shift pilot valve assembly 29 to one of its release positions R or R'. When this happens, pilot passages 31 and 32 will be pressurized and vented, respectively, so spring 64 will open main exhaust valve 58 and allow the pressure in brake cylinder pipe 44, brake cylinder 13 and working space 43a to decrease. This reduces the braking force developed by cylinder 13 and increases the torque output of pneumatic torque motor 28. Assuming that the braking command can be satisfied by dynamic brake 11, torque motor 26 will hold pilot valve assembly 29 in release position until the pressure in brake cylinder pipe 44 has completely dissipated and the torque output of motor 28 has risen to a level proportional to the pressure in pipe 22. This higher torque output may or may not enable pneumatic torque motor 28 to shift pilot valve assembly 29 to lap position because the current in resistor grid 23, and consequently the torque developed by electric motor 26, depends upon train speed as well as upon the setting of controller 24. If the two torques balance, pilot valve assembly 29 will assume the lap position, and spring 61 will be allowed to close exhaust valve 58, whereas if the output of electric torque motor 26 is the higher of the two, assembly 29 will remain in release position and exhaust valve 58 will stay open. In either case, brake cylinder 13 will be vented and the brake it operates will be released.

Further reductions in the pressure in brake pipe 12 will produce corresponding increases in the pressure in outlet pipe 22 and cause controller 24 to raise the field current of the traction motor. This increases dynamic brake effort, the current in grid 23, and the torque output of electric motor 26. As long as the braking command is within the capability of dynamic brake 11, the output of pneumatic torque motor 28, which increases with the pressure in outlet pipe 22, will not exceed the output of electric torque motor 26. Therefore, brake cylinder 13 will remain vented.

If the braking command is increased to a level which exceeds the capability of dynamic brake 11, pneumatic torque motor 28 will overpower electric torque motor 26 and shift pilot valve assembly 29 to application position. At this time, pilot passages 31 and 32 are vented and pressurized, respectively, and springs 62 and 66 open main supply valve 57 and hold main exhaust valve 58 closed. Now, air under pressure can flow from outlet pipe 22 to brake cylinder pipe 44, and the pressure in brake cylinder 13 will commence to rise. Simultaneously, the pressure in working space 43a will increase, and the torque output of pneumatic torque motor 28 will begin to decrease. Accordingly, as the braking effort of cylinder 13 approaches the level required to compensate for the deficiency in the effort of dynamic brake 11, electric torque motor 26 will rotate pilot valve disc 48 toward lap position. When the sum of the efforts of the two brakes equals the braking command, the torques acting on shaft 27 will be balanced, and pilot valve assembly 29 will come to rest in lap position. Therefore, at this time, the pressure in space 63a will rise to the setting of reducer 56, and spring 61 will close supply valve 57.

As indicated earlier, the effectiveness of dynamic brake 11 may either increase or decrease while a brake application is in effect depending upon the absolute speed of the train. In the case of an increase in effectiveness, electric torque motor 26 will shift pilot valve assembly 29 to release position as the current in grid 23 rises and thereby effect opening of exhaust valve 58. If an airbrake application is in effect, this action will bleed air from pipe 44 and reduce the pressure in brake cylinder 13 and in the working space 43a of air motor 43. When the reduction in the braking effort of cylinder 13 offsets the increase in the effort of the dynamic brake, pneumatic torque motor 28 will return pilot valve assembly 29 to lap position and again permit spring 61 to close exhaust valve 58. In the case of a decrease in dynamic brake effectiveness, pneumatic torque motor 28 will shift pilot valve assembly 29 to application position and thereby cause main supply valve 57 to open. This, of course, results in an increase in the pressure in pipe 44 and an increase in the braking effort of cylinder 13. As before, the transducer 25 will return to a balanced, lapped condition when the change in the braking effort of cylinder 13 offsets the change in dynamic braking effort. Thus, if the prevailing braking command is large enough to require action by both brakes, blending transducer 25 will graduate the effort of the airbrake as needed to substantially match the deficiency in the dynamic braking effort.

When the operator subsequently charges brake pipe 12 to release the brakes, triple valve 17 shifts to exhaust position to dissipate the pressure in output circuit 18 and cause relay valve 21 to perform the same function with respect to outlet pipe 22. The decreasing pressure in pipe 22 immediately causes a reduction in the output of pneumatic torque motor 28, so electric torque motor 26 rotates pilot valve assembly 29 to release position and causes exhaust valve 58 to open. The pressure in brake cylinder pipe 44 is now dissipated through exhaust port 59. Simultaneously, or approximately simultaneously, controller 24 reduces the current supplied to the field of the traction motor. When the pressures in pipes 22 and 44 have been dissipated completely, and the propulsion controller in the lead unit has been shifted back to a running position, both brakes will be released and the circuits of dynamic brake 11 will again be in the motoring configuration.

It should be remarked that if there is a failure in dynamic brake 11 which interrupts current flow through grid 23, pneumatic torque motor 28 will maintain pilot valve assembly 29 in application position and cause main supply valve 57 to remain open. This insures continuous communication between brake cylinder pipe 44 and outlet pipe 22 and thus enables the system to afford normal automatic airbrake operation.

DESCRIPTION OF THE FIG. 3 EMBODIMENT

Figure 3:
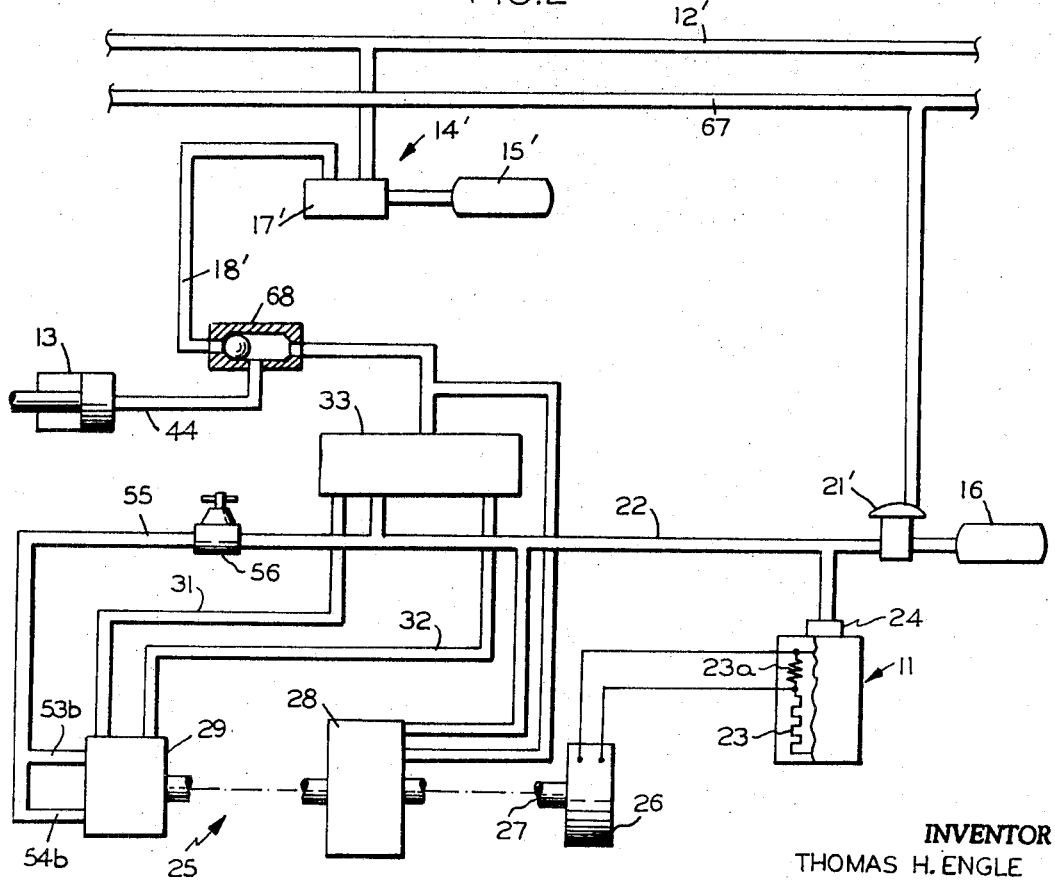
FIG. 3 is a schematic diagram of the improved blending scheme employed on a car equipped with a service air brake of the straight air type and an emergency airbrake of the automatic type.

The most common brake used today on self-propelled electric trains is the electro-pneumatic straight airbrake, and FIG. 3 indicates one way in which blending transducer 25 can be used with this equipment. In this embodiment, the service braking command signal is the pressure in a trainlined straight air pipe 67 which is vented and charged at each car through magnet valves (not shown) interposed, respectively, in connection between the pipe and atmosphere and between the pipe and supply reservoir 16. The pressure in the pipe 67 is sensed directly by the relay valve 21' which establishes and maintains a proportional pressure in outlet pipe 22. Thus, although the pressure changes in pipe 67 required to effect application and release of the brakes are the opposite of the corresponding pressure changes in brake pipe 12 of FIG. 1, it will be evident that the pressure in pipe 22 still represents the magnitude of the braking command and that controller 24 and transducer 25 will operate in the same way as their counterparts in the first embodiment.

Since the straight airbrake is not fail-safe, it is necessary to superimpose a conventional airbrake of the automatic type. The automatic brake includes trainlined brake pipe 12', main reservoir 15' and triple valve 17', and its output pipe 18' is connected with brake cylinder pipe 44 through a shuttle valve 68. The automatic airbrake is used only during emergency applications; therefore, shuttle valve 68 normally assumes the illustrated position in which pipe 44 is connected to the outlet of main valve assembly 33, and brake cylinder 13 is controlled exactly as in the case of the FIG. 1 embodiment. On the other hand, during an emergency application, valve 68 shifts to the right under the action of the pressure in pipe 18' to disconnect brake cylinder pipe 44 from valve 33 and connect it with the output of triple valve 17'. An alternative scheme (not shown) for overlaying the automatic airbrake consists in equipping its control section 14' with a dummy volume comparable to volume 19 in FIG. 1, and in using shuttle valve 68 to selectively connect pipe 18' or straight air pipe 66 with the control port of relay valve 21. However, this proposal is considered inferior to the illustrated version because the automatic airbrake supplies air to brake cylinder 13 through blending transducer 25 and thus could be precluded from effecting a pneumatic brake application in the event of a malfunction in the transducer.

Although, in both of the illustrated embodiments, the output of blending transducer 25 is fed directly to brake cylinder 13, it should be evident that the output could be applied to a relay valve which, in turn, controls air flow to and from the brake cylinder. Moreover, the pneumatic output could be converted to a hydraulic signal and used to actuate a hydraulic brake cylinder. A suitable air-to-hydraulic translator is disclosed in co-pending application Ser. No. 746,684, filed July 22, 1968, now abandoned.

I claim:

1. A braking system for a railway car comprising:
   (a) fluid brake apparatus including a trainlined air pipe (12 or 67) extending through the car, control mechanism (14 or 21') for maintaining in an outlet pipe (22) a pressure corresponding to a braking command pressure signal in the trainlined pipe, and fluid-operated brake-applying means (13);
   (b) a dynamic brake (11) including a resistor grid (23);
   (c) a dynamic brake controller (24) for increasing the braking effort of the dynamic brake (11) as said command pressure signal in the trainlined air pipe (12 or 67) changes in a prescribed sense;
   (d) supply and exhaust valve means (33) for selectively connecting the brake-applying means (13) with the outlet pipe (22) or the atmosphere;
   (e) means (23a, 26, 28) for developing control inputs proportional, respectively, to the current in the resistor grid (23), the command pressure signal, and the pressure supplied to the brake-applying means (13); and
   (f) comparator means (27, 29, 31, 32, 62–66) for controlling the supply and exhause valve means (33) in accordance with the algebraic sum of said control inputs so as to maintain a balance between the input proportional to the command pressure signal and the sum of the other two inputs.

2. A braking system as defined in claim 1 in which:
   (a) the trainliner air pipe is a brake pipe (12);
   (b) the control mechanism includes a triple valve (17) which responds to brake pipe pressure and has an output circuit (18) containing a dummy volume (19) and a relay valve (21), the relay valve being responsive to the output pressure of the triple valve and serving to establish a proportional pressure in the outlet pipe (22); and
   (c) the dynamic brake controller (24) responds to the pressure in the outlet pipe (22) and increases the braking effort of the dynamic brake (11) as that pressure increases.

3. A braking system as defined in claim 2 in which the means for developing a control input proportional to the command pressure signal comprises means (42) responsive to the pressure in the outlet pipe (22).

4. A braking system as defined in claim 1 in which:
   (a) the trainlined air pipe is a straight air pipe (67);
   (b) the control mechanism comprises a relay valve (21') which responds to the pressure in the straight air pipe and establishes a proportional pressure in the outlet pipe (22); and
   (c) the dynamic brake controller (24) increases the braking effort of the dynamic brake (11) as the pressure in the straight air pipe (67) rises.

5. A braking system as defined in claim 4 in which:
   (a) the dynamic brake controller (24) responds to the pressure in the outlet pipe (22); and
   (b) the means for developing a control input proportional to the command pressure signal comprises means (42) responsive to the pressure in the outlet pipe (22).

6. A braking system as defined in claim 4 in which:
   (a) a fluid brake apparatus also includes an automatic brake comprising a trainlined brake pipe (12') extending through the car, and a triple valve (17') which responds to the pressure in the brake pipe (12') and establishes in an output pipe (18') a pressure which increases as brake pipe pressure decreases; and
   (b) a shuttle valve (68) automatically connects the brake-applying means (13) with the supply and exhaust valve means (33) or the output pipe (18') of the triple valve (17') depending upon which of these components supplies air at the higher pressure.

7. A transducer comprising:
   (a) pneumatic input (22) and output (44) passages;
   (b) a comparator member (27) mounted for movement between application and release positions;
   (c) electric motor means (26) arranged to shift the comparator member (27) toward release position, the shifting force produced by the motor means varying substantially linearly with the input current applied to it within the range of movement of the comparator member;
   (d) pneumatic motor means (28) responsive to the difference between the pressures in the input and output passages (22, 44) and acting on the comparator member (27) in opposition to the electric motor means (26), the pneumatic motor means exerting a resisting force which increases with increases in input pressure and decreases with increases in output pressure;
   (e) first and second pilot valves (48, 53 and 48, 54) operated by the comparator member (27) and each having a control chamber (53a or 54a) and being adapted to open and close an exhause path leading from the control chamber, the valves being substantially balanced with respect to the pressures in their control chambers so that their opening and closing movements are essentially unaffected by said pressures;
   (f) a supply valve (57) controlling communication between the input and output passages (22, 44), and an exhaust valve (58) controlling communication between the output passage (44) and an exhaust connection (59); and
   (g) actuating means, including first and second piloted pressure motors (62, 63 and 64, 65) connected, respectively, with the control chambers (53a, 54a) of the first and second pilot valves, for opening the supply valve (57) when the comparator member (27) is in application position, for opening the exhaust valve (58) when the comparator member is in release position, and for closing both valves when the comparator member is in an intermediate, lap position.

8. A transducer as defined in claim 7 in which the pneumatic motor means comprises:
   (a) a drive member (38) connected with the comparator member (27) so as to resist motion of the latter under the action of the electric motor means (26);

(b) a calibration spring (39) reacting between the drive member and a seat (41) and causing the drive member to urge the comparator member toward application position;

(c) a first air motor (42) connected with the input passage (22) and urging the seat in the spring-loading direction, and a second air motor (43) connected with the output passage (44) and urging the seat in the opposite direction; and (d) a meter spring (45) biasing the seat (41) in the spring-unloading direction.

References Cited

UNITED STATES PATENTS

| | | | |
|---|---|---|---|
| 3,275,380 | 9/1966 | May | 303—3 |
| 3,398,993 | 8/1968 | Sarbach et al. | 303—20 |

TRYGVE M. BLIX, Primary Examiner

J. J. McLAUGHLIN, Jr., Assistant Examiner

U.S. Cl. X.R.

303—15, 20, 40